(12) United States Patent
Fein et al.

(10) Patent No.: US 7,542,752 B2  
(45) Date of Patent: Jun. 2, 2009

(54) METHOD AND DEVICE FOR ADJACENT CHANNELS OPERATION

(75) Inventors: Yaron Fein, Rechovot (IL); Ronen Akerman, Modi'in (IL); George Lazar, Kiriat Ono (IL)

(73) Assignee: Go Net Systems Ltd., Tel Aviv (IL)

( * ) Notice: Subject to any disclaimer, the term of this patent is extended or adjusted under 35 U.S.C. 154(b) by 402 days.

(21) Appl. No.: 11/128,263

(22) Filed: May 13, 2005

(65) Prior Publication Data

US 2006/0258315 A1 Nov. 16, 2006

(51) Int. Cl.
*H04B 1/26* (2006.01)

(52) U.S. Cl. .................. 455/316; 455/209; 343/893

(58) Field of Classification Search .......... 343/700 MS, 343/829, 846, 893; 455/205, 208, 209, 313–316
See application file for complete search history.

(56) References Cited

U.S. PATENT DOCUMENTS

| | | | |
|---|---|---|---|
| 4,866,451 A | | 9/1989 | Chen |
| 4,943,809 A | * | 7/1990 | Zaghloul ............. 343/700 MS |
| 4,972,346 A | * | 11/1990 | Kawano et al. ................. 455/9 |
| 6,326,923 B2 | | 12/2001 | Shigihara |
| 7,139,545 B2 | * | 11/2006 | Drentea ...................... 455/314 |
| 2001/0021229 A1 | * | 9/2001 | Belaiche ...................... 375/295 |
| 2004/0080455 A1 | * | 4/2004 | Lee ..................... 343/700 MS |
| 2004/0189532 A1 | | 9/2004 | Nakano |
| 2006/0139232 A1 | * | 6/2006 | Martin ........................ 343/895 |

FOREIGN PATENT DOCUMENTS

WO    WO9908337 A1    7/1997

\* cited by examiner

*Primary Examiner*—Nhan T Le
(74) *Attorney, Agent, or Firm*—Vladimir Sherman; Professional Patent Solutions (57) ABSTRACT

A method and device for adjacent channels operation based on downconverting the input signal to an IF signal, filtering the IF signal, and upconverting the filtered IF signal to the original frequency. The present invention is primarily directed to applications involving the use of standard RF transceiver which does not incorporate a high Q filter. Moreover, the present invention may be used with a circular polarized cross recessed corners stacked array antenna in order to further improve its adjacent channels operation performance.

9 Claims, 5 Drawing Sheets

METHOD AND DEVICE FOR ADJACENT CHANNELS OPERATION

FIELD AND BACKGROUND OF THE INVENTION

The present invention relates to signals filtering used in receivers and, more particularly, to method and device for adjacent channels operation based on downconverting the input signal to an IF signal, filtering the IF signal, and upconverting the filtered IF signal to the original frequency. The present invention is primarily directed to applications of telecommunication, however, the present invention clearly can be directed to other applications in a variety of other fields involving the use of standard RF transceiver which does not incorporate a high Q filter.

Basic principles and details relating to adjacent channels operation needed for properly understanding the present invention are provided herein. Complete theoretical descriptions, details, explanations, examples, and applications of these and related subjects and phenomena are readily available in standard references in the fields of telecommunication and signal filtering.

When operating adjacent and/or adjacent channels, there is a need for high Q filtering of the adjacent channels. The Q factor determines the sharpness of the response of the filter, corresponding to its degree of resonance. The greater the Q factor, the sharper the filter. When the Q factor is high, the frequency response is sharply focused around the resonance frequency.

Prior art solutions filter the signal within a RF transceiver. A significant general limitation of currently available solutions that are based on filtering the signal within a standard RF transceiver, is that the standard RF transceiver must incorporate a high Q filter in order to filter the adjacent channels. The necessity of a high Q filter becomes quite cumbersome when there is a need for standard and/or commercial off the shelf RF transceiver.

Moreover, previous art devices such as noise cancellation, interference cancellation, and regular channel filters are expensive solutions for leakages between adjacent channels.

A significant general limitation of currently available interference cancellation devices, is that they are using a small fraction of the transmitted signal with a phase correction to cancel the leakages between the adjacent channels. Therefore, interference cancellation is an expensive and sensitive solution because of the need to control the phase and amplitude of the correcting signal by means of vector modulators or phase shifters, which are sensitive and expensive components. In addition, the implementation of interference cancellation is problematic because of the parasitic capacitors which require evaluation and compensation.

Recently, several devices, based on circular polarized antennas have been disclosed. In these disclosures there is no reference to the novel embodiment of the present invention.

There is substantial prior art regarding circular polarized antennas. However, none of the following indicated prior art refers to highly isolated, circular polarized, multiple, independent, closely mounted antennas, or includes the important feature of recessed corner patches, or includes the important feature of the novel channel filter of the present invention.

Prior art includes various teachings of using recessed corners. In PCT International Patent Application Publication No. WO/9908337A1, issued to Hansen Per Steinar et al., there is disclosed a method of using a microwave antenna comprises a dielectric substrate with an emitter element and a feed line to the emitter element, and on the substrate underside there is a ground plane for the feed line. A separate ground plane for the emitter element is arranged at a larger distance from the substrate, and the two ground planes are interconnected electrically. The feed line ground plane is shaped with a tuning section extending somewhat in underneath the emitter element, and the tuning section is connected to the rest of the feed line ground plane via a transition section. However, there is no description or suggestion for using more than one recessed corner patch. Moreover, Hansen Per Steinar et al. provides no description or suggestion relating to determining and/or using two complementary recessed corners patches, and no description or suggestion relating to using the novel channel filter of the present invention.

In U.S. patent application Ser. No. 20040189532A1, issued to Nakano Hisamatsu et al., there is disclosed an antenna apparatus comprises a dielectric substrate, a radiation element buried in the dielectric substrate, and a feeding lead connected to the radiation element and extracted outward from the dielectric substrate. The dielectric substrate is covered with a conductor cover except an exposed portion left on a front surface thereof. The conductor cover comprises a side wall portion extending in a thickness direction of the radiation element and covering all side surfaces of the dielectric substrate, and a hood portion extending from an upper edge of the side wall portion and covers a part of the front surface of the dielectric substrate. The hood portion has a trapezoidal or a rectangular shape. Here too, there is no description or suggestion relating to using more than one recessed corner patch. Moreover, Nakano Hisamatsu et al. provides no description or suggestion relating to determining and/or using two complementary recessed corners patches, and no description or suggestion relating to using the novel channel filter of the present invention.

In U.S. Pat. No. 6,326,923, issued to Shigihara Makoto, there is disclosed a miniaturized circular polarized microstrip antenna that employs a dielectric substrate having a large relative dielectric constant so that a desired resonance frequency and a desired axis ratio are obtained. In a circular polarized wave microstrip antenna having a nearly square dielectric substrate with a nearly square patch electrode formed on one surface thereof, and a ground electrode formed on almost the whole of another surface thereof, triangular first notches and serving as retraction-separation elements are respectively formed 135 and 315 degrees with respect to a direction toward a feeding point from the center of the patch electrode, which is defined as 0, and within the first notch, a first adjustment electrode extending outwardly from an edge of the patch electrode is formed. On the other hand, a triangular second notch is formed 45 degrees with respect to a direction toward the feeding point from the center of the patch electrode, which is defined as 0, and within the second notch, a second adjustment electrode extending outwardly from an edge of the patch electrode is formed. Here too, there is no description or suggestion relating to using more than one recessed corner patch. Moreover, Shigihara Makoto provides no description or suggestion relating to determining and/or using two complementary recessed corners patches, and no description or suggestion relating to using the novel channel filter of the present invention In U.S. Pat. No. 4,866,451, issued to Chen Chun-Hong, there is disclosed a circular polarization technique and a microstrip array antenna implementing this technique. Using four microstrip radiating elements with proper phasing of the excitation in a 2×2 array configuration, the technique averages out the cross-polarized component of the radiation, generating circular polarization of high purity. The technique is broadband and capable of dual-polarized operation. The resultant 2×2 array can be used either independently as a circular polarization radiator or as the building subarray for a larger array. Here too, there is no description or suggestion relating to using more than one recessed corner patch. Moreover, Chen Chun-Hong provides no description or suggestion relating to determining and/or using two complementary recessed corners patches, and no description or suggestion relating to using the novel channel filter of the present invention.

To date, the inventor is unaware of prior art teaching of adjacent channels operation based on downconverting the input signal to an IF signal, filtering the IF signal, and upconverting the filtered IF signal to the original frequency.

To one of ordinary skill in the art there is thus a need for, and it would be highly advantageous to have a method and device for adjacent channels operation based on downconverting the input signal to an IF signal, filtering the IF signal, and upconverting the filtered IF signal to the original frequency.

Moreover, there is a need for, and it would be highly advantageous to have a standard RF transceiver which does not incorporate a high Q filter, in order to reduce costs and improve time-to-market.

It is also desirable to have adjacent channels featuring the novel channel filter of the present invention and a highly isolated, circular, polarized smart antenna featuring recessed corner patches.

SUMMARY OF THE INVENTION

The present invention relates to signals filtering used in receivers and, more particularly, to method and device for adjacent channels operation based on downconverting the input signal to an IF signal, filtering the IF signal, and upconverting the filtered IF signal to the original frequency. The present invention is primarily directed to applications of telecommunication, however, the present invention clearly can be directed to other applications in a variety of other fields involving the use of standard RF transceiver which does not incorporate a high Q filter.

The present invention successfully addresses shortcomings and limitations of presently known methods and devices for adjacent channels operation, by being simpler, and more cost effective, than currently used techniques for adjacent channels operation. The method of the present invention is readily implemented using standard local oscillators and standard filters for achieving great results. Moreover, the method of the present invention is generally applicable as a 'stand-alone' signal filter, or, as a signal filter used in combination with other methods, devices, and systems, performing adjacent channels operation such as highly isolated antennas.

Thus, according to the present invention, there is provided a method for adjacent channels operation featuring: (a) receiving an input signal, (b) downconverting the received signal to a predefined intermediate frequency, (c) filtering the downconverted received signal, (d) upconverting the filtered signal.

According to further features in preferred embodiments of the present invention, the filtered signal is to approximately the original frequency of the input signal.

According to still further features in the described preferred embodiments, the predefined intermediate frequency is in a bandwidth having available standard filters.

According to still further features in the described preferred embodiments, the downconverting and the upconverting are performed by using the same local oscillator.

According to still further features in the described preferred embodiments, the filtering the downconverted received signal further comprising processing the downconverted received signal.

According to still further features in the described preferred embodiments, the converting the downconverted received signal to at least one additional intermediate frequency.

According to still further features in the described preferred embodiments, the upconversion of the filtered signal is to a predefined frequency in which off-the-shelf transceiver exists.

According to still further features in the described preferred embodiments, there is using the upconverted filtered signal.

According to still further features in the described preferred embodiments, there is feeding a standard transceiver with the upconverted filtered signal.

According to another aspect of the present invention, there is provided a device for adjacent channels operation comprising: (a) an array antenna comprising at least one antenna element, (b) at least one signal downconverter coupled to each the at least one antenna element, (c) at least one filter coupled to the at least one signal downconverter, (d) at least one signal upconverter coupled to the at least one filter.

According to further features in preferred embodiments of the present invention, the signal upconverter is upconverting the signal to approximately the original frequency of the signal.

According to still further features in the described preferred embodiments, the at least one signal downconverter is downconverting the signal to a predefined intermediate frequency having available standard filters.

According to still further features in the described preferred embodiments, the downconverter and the upconverter are using a same local oscillator.

According to still further features in the described preferred embodiments, there is further comprising at least one additional downconverter.

According to still further features in the described preferred embodiments, the signal upconverter is upconverting the signal to a predefined frequency in which off-the-shelf transceiver exists.

According to still further features in the described preferred embodiments, there is further comprising at least one standard transceiver coupled to the at least one signal upconverter.

According to still further features in the described preferred embodiments, the array antenna is a circular polarized array antenna comprising: (a) a feeding patch having cross recessed corners, (b) a radiating patch having complementary cross recessed corners.

According to still further features in the described preferred embodiments, each element of the circular polarized array antenna comprising at least two radiating elements fed from the same input.

According to still further features in the described preferred embodiments, the characteristics of the circular polarized array antenna are controlled by setting different values and combinations to parameters comprising: (a) size of the cross-recessed corners, (b) distance between the two radiating elements fed from the same input, (c) distance between the radiating patch and the feeding patch, (d) thickness and type of a sandwiched dielectric material located between the feeding patch and the radiating patch.

According to still further features in the described preferred embodiments, the array antenna is a circular polarized stacked array antenna comprising: (a) feeding patches having cross recessed corners, (b) radiating patches having cross recessed corners, (c) at least one sandwiched cross-recessed corner patch, wherein the patches are arranged in such a way that every two following stacked patches are cut in the complementary corners.

BRIEF DESCRIPTION OF THE DRAWINGS

The present invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the present invention. In this regard, no attempt is made to show structural details of the present invention in more detail than is necessary for a fundamental understanding of the invention, the description taken with the drawings making apparent to those skilled in the art how the several forms of the invention may be embodied in practice. Identical structures, elements or parts which appear in more than one figure are preferably labeled with a same or similar number in all the figures in which they appear. In the drawings.

DESCRIPTION OF THE PREFERRED EMBODIMENTS

The present invention relates to signal filtering used in receivers and, more particularly, to method and device for adjacent channels operation based on downconverting the input signal to an IF signal, filtering the IF signal, and upconverting the filtered IF signal to the original frequency. The present invention is primarily directed to applications of telecommunication, however, the present invention clearly can be directed to other applications in a variety of other fields involving the use of standard RF transceiver which does not incorporate a high Q filter.

The present invention is most useful when at least two channels are in very close proximity to one another, and one channel transmits while the other channel receives.

A general aspect of novelty and inventiveness of the present invention is the ability to use a standard RF transceiver which does not incorporate a high Q filter.

Another particular aspect of novelty and inventiveness of the present invention is the use of a highly isolated, circular, polarized smart antenna featuring recessed corner patches Another particular aspect of novelty and inventiveness of the present invention is the ability to locate several access points (AP's) operating on adjacent channels near each other without any degradation in performance. In conventional AP's, the transmitted signals from co-located AP's either create inter-modulations that degrade the receiver performance or raise the total noise in the adjacent channel.

Based upon the above indicated aspects of novelty and inventiveness, the present invention successfully addresses the shortcomings, and widens the scope, of presently known configurations of adjacent channels operation is providing an effective and efficient method and corresponding device for obtained a sharply filtered input signal.

In addition to the novel channel filter of the present invention, there is disclosed a novel highly isolated, circular, polarized smart antenna featuring recessed corner patches.

Therefore, another aspect of both the novelty and inventiveness of the present invention is the ability to provide a high Q filters and a low-cost, durable and compact antenna array featuring simultaneously transmitting antennas and receiving antennas that use the same frequencies or adjacent frequencies that may interfere with one another.

Another aspect of novelty and inventiveness of the present invention is the efficient use of the installation area as due to the compactness of the antenna array of the present invention.

In contrast with the present invention, prior art solutions use a longer distance between the antennas or use widely spaced frequencies that do not interfere with one another. For example, in an 802.11 g system, prior art adjacent antennas use channels 1 and 11 that do not interfere with one another. By using the antenna of the present invention, it is possible to use the three non-overlapping FCC channels 1, 6, and 11, or ETSI channels 1,7 and 12/13. It is to be understood that transmission in either channel create unwanted energy transmitted in adjacent channels mainly due to non-linear power amplifiers. Channels 1, 6 and 11 represent signals with tails that interfere with one another and therefore require an antenna system that features a high degree of isolation.

Another unique aspect of novelty and inventiveness of the present invention relating to a high degree of antenna isolation that reduces the effect of interference from surrounding devices. This is especially important when the antenna array simultaneously features transmitting antennas and receiving antennas.

Another particular aspect of novelty and inventiveness of the present invention relating to the high degree of mutual coupling between the radiating elements. As a result, an almost zero null can be achieved in transmission and reception. The depth of the null is related to the size of the antenna's isolation. The better the antenna's isolation, the deeper the achieved null. A person skilled in the art should be able, mathematically, to prove that if the mutual coupling is less than 20-25 dB, it is impossible to achieve a deep null. In an exemplary embodiment of the present invention, the number of elements in an array antenna is 'N'. The number 'N' determines the number of possible nulls, which is N-1. The depth of the null is determined by an exact calculation in the DSP, along with mutual coupling between elements of the antenna. For example, an array antenna made of four elements makes it possible to achieve three nulls.

The present invention is a method and corresponding device for adjacent channels operation. The preferred embodiments of the present invention are discussed in detail below. It is to be understood that the present invention is not limited in its application to the details of the order or sequence of steps of operation or implementation of the method and/or to the details of construction, arrangement, and, composition of the components of the device, set forth in the following description, drawings, or examples. While specific steps, configurations and arrangements are discussed, it is to be understood that this is done for illustrative purposes only. A person skilled in the relevant art will recognize that other steps, configurations and arrangements can be used without departing from the spirit and scope of the present invention.

The present invention is capable of other embodiments or of being practiced or carried out in various ways. Also, it is to be understood that the phraseology, terminology, and, notation, employed herein are for the purpose of description and should not be regarded as limiting.

Throughout the following description and accompanying drawings there is first provided detailed description of a preferred embodiment of the novel channel filter, followed thereafter by detailed description of a preferred embodiment of the highly isolated, circular, polarized smart antenna featuring recessed corner patches.

Steps, components, operation, and implementation of the method and device for adjacent channels operation, according to the present invention, are better understood with reference to the following description and accompanying drawings.

Figure 1:
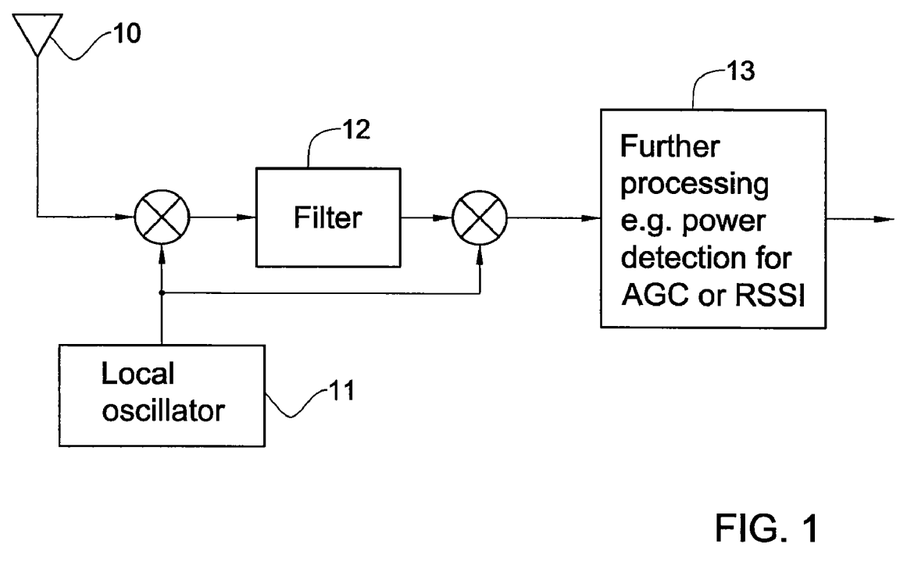
FIG. 1 is a block diagram illustrating an exemplary preferred embodiment of the novel channel filter, in accordance with the present invention.

Referring now to the drawings, FIG. 1 is a block diagram illustrating an exemplary preferred embodiment of the novel channel filter, in accordance with the present invention. In FIG. 1, the input signal is downconverted to an IF signal by using local oscillator 11. The IF signal is filtered by filter 12. The filtered signal is than upconverted to the original frequency by using local oscillator 11 or by any other means.

In the following description of the method and device of the present invention, included are only main or principal steps needed for sufficiently understanding proper 'enabling' utilization and implementation of the disclosed adjacent channels operation. Accordingly, descriptions of the various required or optional minor, intermediate, and/or, sub steps, which are readily known by one of ordinary skill in the art, and/or, which are available in the prior art and technical literature relating to signals filtration, are not included herein.

There is Receiving an Input Signal.

The input signal is preferably received from an antenna device 10.

It is to be understood that the present invention is not limited to filtering of input signals received from an antenna but is capable of filtering other types of input signals featuring high frequency and/or lack of available filters and/or highly expensive filters in the specific frequency.

Figure 2:
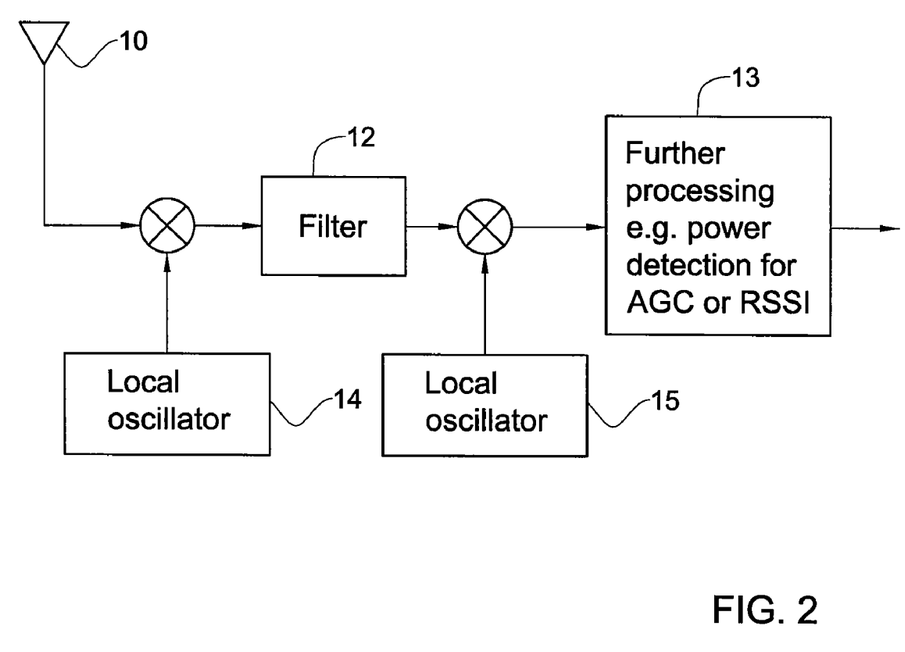
FIG. 2 is a block diagram illustrating another exemplary preferred embodiment of the novel channel filter, in accordance with the present invention.

In an exemplary embodiment of the present invention, antenna device 10 is an array antenna featuring N elements. It is to be understood that FIG. 1 and FIG. 2 are just an illustrative representation of the present invention. When using an array antenna, the novel channel filter of the present invention may be added to all antenna's elements or only to selected elements.

There is Downconverting the Received Signal to a Predefined Intermediate Frequency.

In an exemplary embodiment of the present invention, the signal is downconverted to a predefined intermediate frequency (IF). The predefined intermediate frequency should be in a bandwidth having standard and/or inexpensive and/or available filters.

Referring to FIG. 1, the input signal is downconverted to the IF signal by using local oscillator 11.

There is Filtering the Downconverted Received Signal.

The downconverted signal is filtered by an appropriate filter.

In an exemplary embodiment of the present invention, the IF filter is a commercial off-the-shelf IF filter. For example, BW/central frequency (1/Q) of 10% (i.e. Q=10).

Referring to FIG. 1, the IF signal is filtered by filter 12.

Optionally, There is Further Processing the Downconverted Received Signal.

Optionally, the signal is further processed prior to upconversion. For example, power detection of the received signal for applications such as AGC (Automatic Gain Control), RSSI (Received Signal Strength Indications), etc.

Additional optional embodiment of the present invention is a "loop-back" implementation, in which transmitted signal in a TDMA system is coupled to the receiver path in order to enable various calibration procedures of the transmit or receive path.

According to another optional embodiment of the present invention, in a conventional heterodyne receiver, the signal at the low frequency is further converted to a $2^{nd}$ IF, and than demodulated or sampled.

There is Upconverting the Filtered Signal.

In an exemplary embodiment of the present invention, the filtered downconverted received signal is upconverted to approximately the original frequency of the received input signal.

In another exemplary embodiment of the present invention, the filtered downconverted received signal is upconverted to a predefined frequency in which off-the-shelf transceiver exists. Referring to FIG. 2, local oscillator 14 downconverts the signal to an intermediate frequency and local oscillator 15 upconvert the signal to a frequency that is different than the original frequency.

For example, in order to implement an 802.11a receiver operating in the 5.8 GHz band, it is possible to use the filter of the present invention and upconvert the signal back to the 2.4 GHz, and use a standard off-the-shelf 802.11b/g transceiver RFIC.

There is Using the Upconverted Filtered Signal.

The upconverted filtered signal of the present invention is especially useful in systems having a need to strong adjacent channel filtering that standard transceiver does not support.

Optionally, There is Feeding a Standard Transceiver with the Upconverted Filtered Signal.

In an exemplary embodiment of the present invention, the upconverted filtered signal is forwarded to a commercial off-the-shelf transceiver. Commercial off-the-shelf transceiver may offer, among other, the following benefits:

Low priced because of its mass production.

A large extent of added functionality is available.

When compared, discrete components performing the same tasks achieved by the standard transceiver are more expensive.

A commercial off-the-shelf transceiver reduces time-to-market because it usually includes all the functionality for a required standard, including, for example: gain control, IQ demodulation, IQ calibration, base band filters, local oscillator, and synthesizer.

In another preferred embodiment of the present invention, there is operating adjacent channels featuring: (a) receiving the input signal from the novel, disclosed below, cross recessed corner patches antenna, (b) downconverting the input signal to an IF signal, (c) filtering the IF signal, (d) upconverting the filtered IF signal to the original frequency.

The cross recessed corner patches antenna of the present invention features a pair of radiating elements. Each pair of radiating element is fed from the same input. Moreover, the cross recessed corner patches antenna of the present invention is a stacked antenna where each radiating element is made of feeding patch and radiating patch. All radiating patches and their feeding patches are square.

The cross recessed corner patches antenna of the present invention features circular polarization. The circular polarization is achieved by using radiating element featuring recessed corners, as known in the art.

According to another preferred embodiment of the present invention, the corners of a radiating patch and the corners of its feeding patch are cut in opposite directions. In other words, the cross recessed corners of the radiating element are the complement cross corners of the feeding element.

In the description of the present invention, a recessed corner is the same as a square with at least one cut corner.

It is to be understood that the filter of the present invention improves the inter-antenna-array isolation (adjacent channels), whereas the cross-recessed-corner antenna of the present invention improves the inter-element isolation. The combination of the filter and cross-recessed-corner antenna of the present invention enable the production of the novel, compact, and high performance, array antenna of the present invention.

The use of recessed corner feeding patches result in improved cross-polarization. Improved cross-polarization leads to better isolation between radiating elements of an array antenna and to an antenna featuring improved isolation from its surroundings. For example, the improved cross-polarization may increase the antenna's isolation between two adjacent channels from 30 dB to 50 dB.

The characteristics of the cross recessed corner patches antenna of the present invention can be controlled by setting different values and combinations to the following parameters:

a) The size of the cross-recessed corners.

b) The distance between the two radiating elements fed from the same input.

c) The distance between the radiating patch and the feeding patch.

d) Thickness and type of the dielectric material located between the radiating element and the patch.

An axial ratio measures the distortion of the circular polarization. An ideal circular polarized antenna feature an axial ratio having a value of one that indicates that the circular polarization is circular and not elliptical. In accordance with the present invention, there is using two antenna elements connected to the same input for achieving a better axial ratio. By choosing the proper distance between the radiating elements, a low axial ratio, maintained over the whole operating bandwidth, is obtained.

The distance between the radiating patch and the feeding patch affects the obtained bandwidth of the antenna. The larger the distance between the radiating patch and the feeding patch, the better the bandwidth. On the other hand, the larger the distance between the radiating patch and the feeding patch, the circular polarization clearness is decreased. It is to be understood that the optimal thickness depends on the required antenna characteristics and on its operating frequencies.

The distance between the radiating patch and the feeding patch may be achieved by known in the art methods. An exemplary method uses a dielectric form, known also as "stacking". The distance between the radiating patch and the feeding patch may be determined by known in the art optimization methods The cross recessed corners increase the cross polarization rejection. As the cross-polarization rejection is higher, a better filtration of the opposite polarization is achieved. For example, by using cross-recessed corners, the cross polarization while operating in 2.4 GHz may be better than 30 dB.

After introducing the novel elements of the cross recessed corner patches antenna of the present invention and their placements, it is to be understood that a person skilled in the art of antenna design is able to determine the appropriate sizes, distances and thickness for a required performance.

Figure 3:
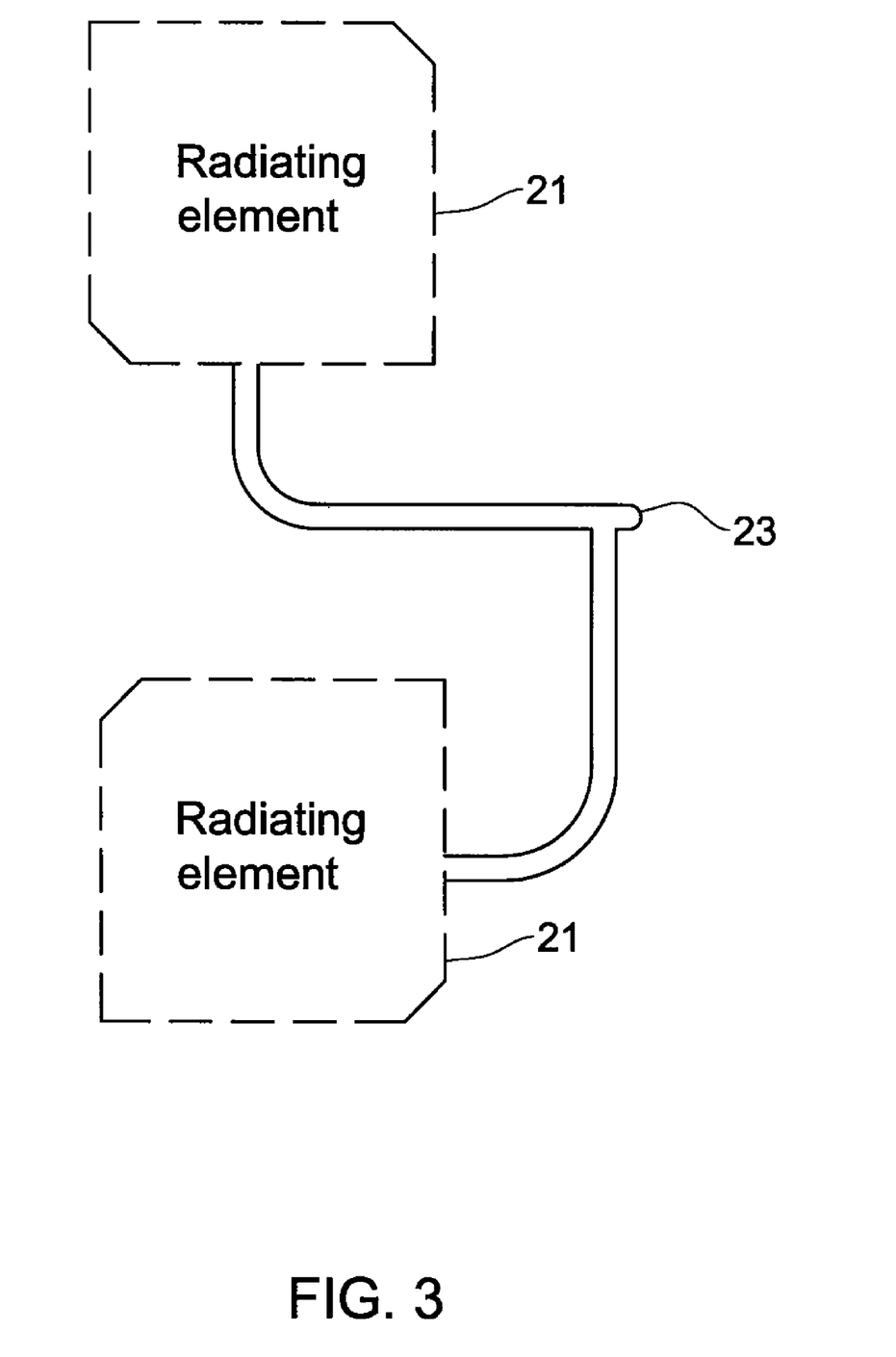
FIG. 3 is an illustration of a preferred embodiment of the circular polarized antennas with shifted polarization feeds, in accordance with the present invention.

Referring to FIG. 3, in an exemplary embodiment of the present invention, additional isolation is gained by applying shifted-polarization to two antennas. The antennas are connected to the same input. As the polarization becomes clearer, the cross-polarization isolation effect between two radiating elements connected to the same input is increased.

Figure 6:
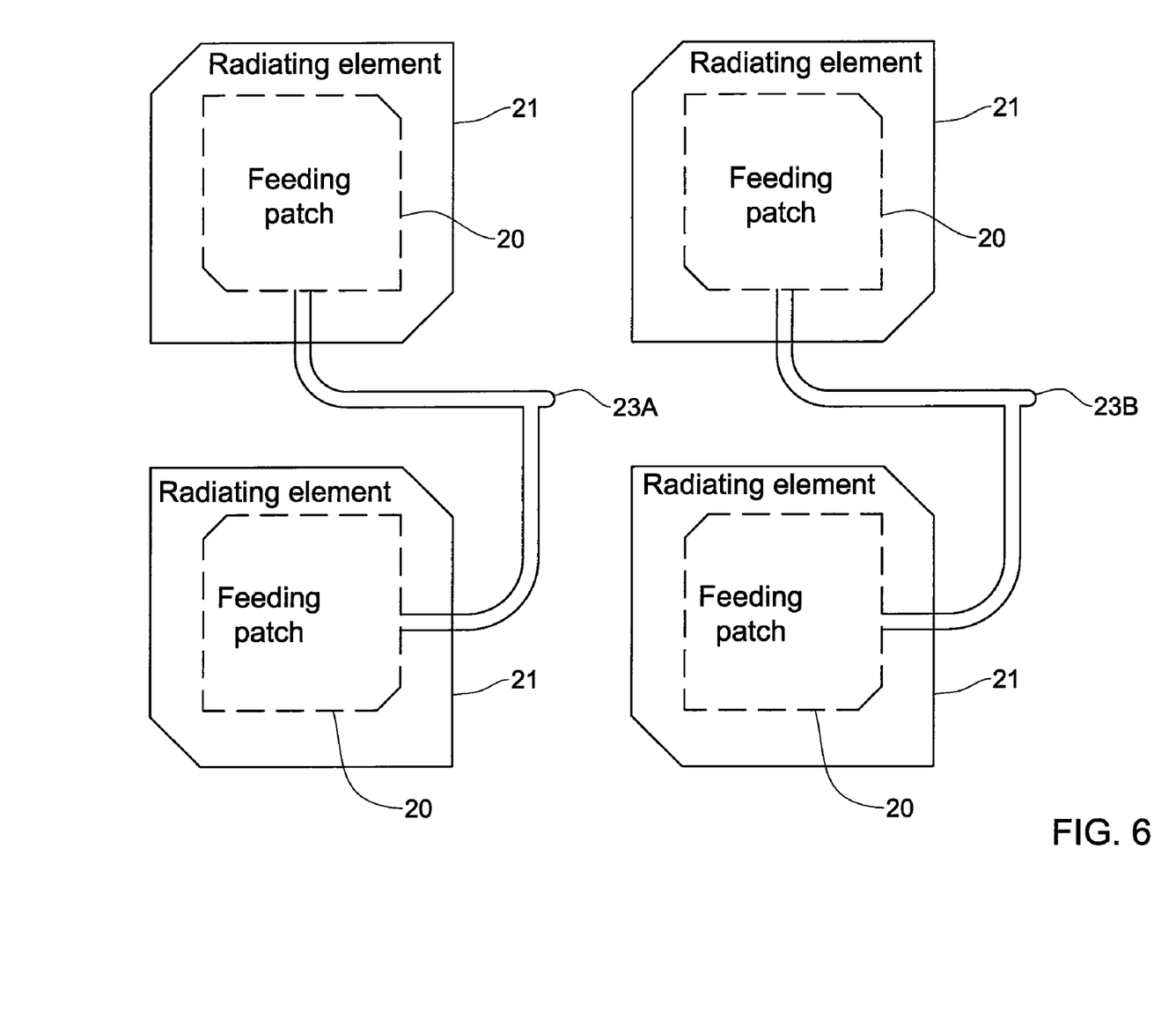
FIG. 6 is an illustration of a preferred embodiment of the circular polarized patch array antenna recessed corner, in accordance with the present invention.

Referring to FIG. 6, in order to clear the polarization, a circular polarized patch antenna with recessed corners is used.

Figure 4:
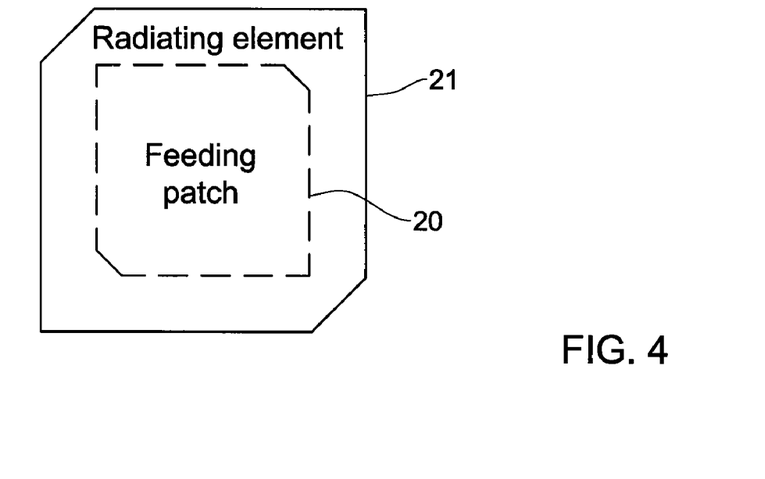
FIG. 4 is an illustration of a preferred embodiment of the circular polarized patch antenna recessed corner, in accordance with the present invention.

Referring to FIG. 4, adding the recessed corner feeding patch further increases the degree of antenna isolation. For example, the degree of antenna isolation may be increased by 5 to 15 dB.

Prior art disclose cross-recessed corner antennas. However, prior art cross-recessed corner antennas are disclosed without a recessed corner patch. Adding the recessed corner patch further increases the isolation. This is because the recessed corner patch cleans the circular polarization.

The corner incision of the radiating patch is in opposite direction to the incision of the feeding patch.

Referring again to FIG. 4, radiating element 21 features cross recessed corners. Feeding patch 20 features complementary cross recessed corners. The dimensions of the cut of each corner affect the cross polarization and axial ratio. The selection of which cross corners to cut sets the direction of the polarization. The dimensions of the cut are a tradeoff between proper axial ratio and cross polarization. In an exemplary embodiment of the present invention, the actual dimensions of each cut and the crossed corners to be cut are obtained by using an optimization process.

Figure 5:
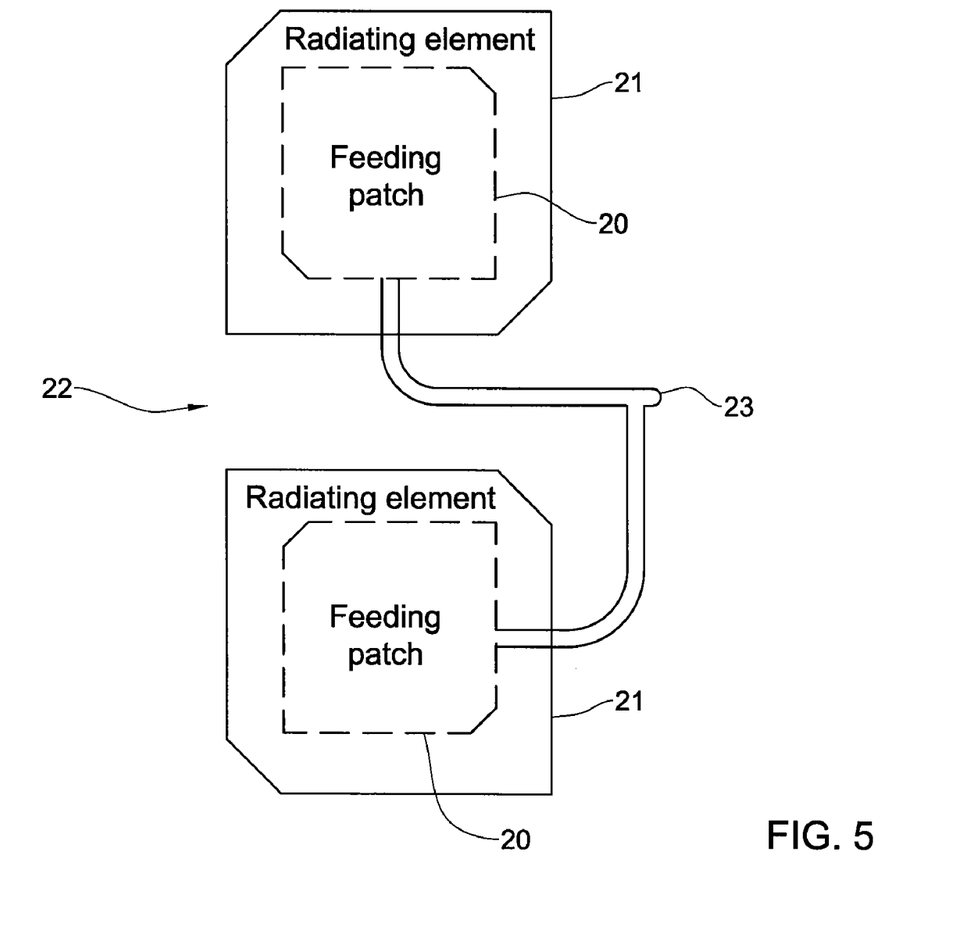
FIG. 5 is an illustration of a preferred embodiment of the circular polarized patch antenna recessed corner connected pair, in accordance with the present invention.

Referring to FIG. 5, every pair of connected antennas is cut in the opposite direction. The two connected antennas are fed from the same input 23. In other words, the two connected antennas are polarization shifted.

In an exemplary embodiment of the present invention, only one pair of antennas is implemented, resulting in a circular polarized antenna having a high level of isolation.

According to another embodiment of the present invention, an array of antennas is implemented. Due to the fact that each antenna is made as illustrated in FIG. 5, the antennas in the array less interfere one another and therefore can be placed closer to one another. In an exemplary embodiment of the present invention, the various antennas in the array are independent on one another. According to another exemplary embodiment of the present invention, the various antennas in the array are dependent on one another.

FIG. 6 illustrates an antenna array. Referring to FIG. 6, in an exemplary preferred embodiment of the present invention, all antennas in the same row feature recessed corners in the same direction.

Figure 7:
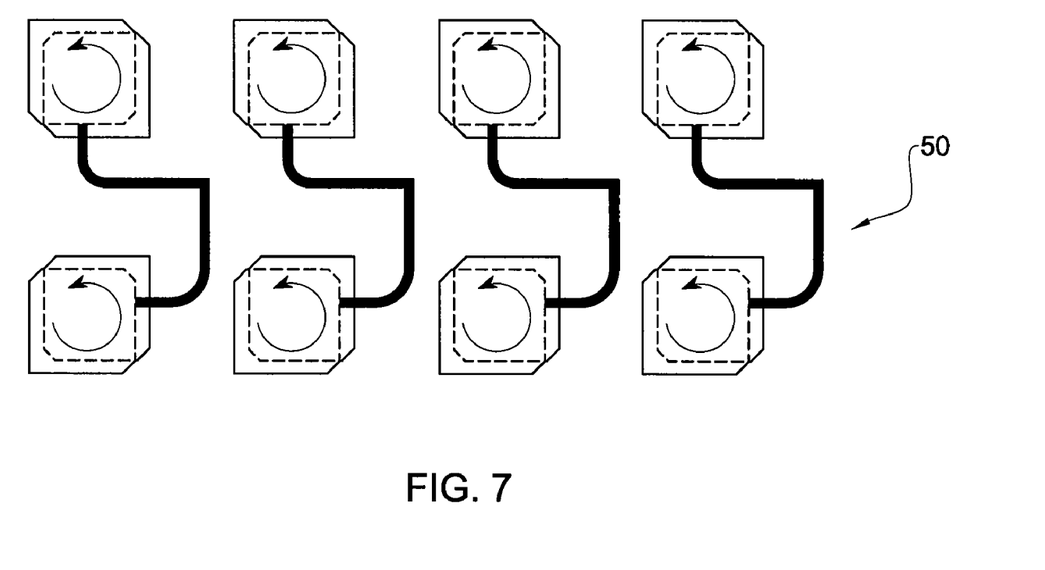
FIG. 7 is an illustration of a preferred embodiment of the smart antenna, in accordance with the present invention.

FIG. 7 illustrate the circular polarization directions according to an exemplary preferred embodiment of the present invention wherein all antennas in the same row feature recessed corners in the same direction.

In another preferred embodiment of the present invention, adjacent antennas in the same row feature recessed corners in the opposite direction, resulting in phase reversal between the radiating elements.

Moreover, when using modulations such as OFDM, the tails of a signal interfere with the adjacent signals. Therefore, the additional isolation achieved by the cross recessed corner patches antenna of the present invention is required for reducing the effects of the aforementioned interference.

Figure 8:
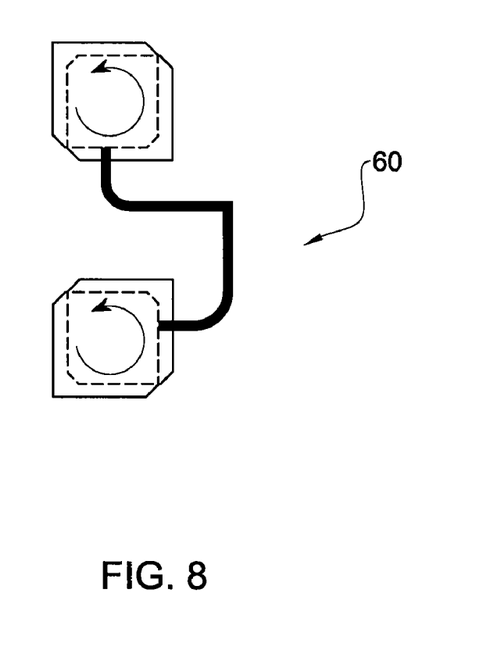
FIG. 8 is an illustration of an additional feeding connection, in accordance with the present invention.

FIG. 8 illustrate additional exemplary possible feeding connection. It is to be understood that there are additional possible feeding connections according to the novel description of the cross recessed corner patches antenna of the present invention. For example, two shifted antennas connected to the same input where the feeding is shifted in the same direction and there is about a quarter wavelength difference between length of the waveguides.

In an exemplary embodiment of the present invention, the system of the present invention communicates in two different frequencies. Optionally, each frequency has its own antenna. For example, in an 802.11 type of system, 802.11b and 802.11 g transmissions may use the same antenna, because they feature the same frequency, but 802.11a transmissions should use a different antenna.

As known in the art, adding additional stacks can improve the usable bandwidth of the antenna. Moreover, different dielectric materials possibly featuring different thicknesses may be use. According to the present invention, further improvement of cross polarization bandwidth of a stack antenna featuring at least two patches is achieved by using cross-recessed corner patches that are arranged is such a way that every two following patches are cut in the opposite corners.

Thus, it is understood from the embodiments of the invention herein described and illustrated, above, that the method and device for adjacent channels operation, of the present invention, are neither anticipated or obviously derived from the prior art.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

It is to be understood that the present invention is not limited in its application to the details of the order or sequence of steps of operation or implementation of the disclosed method or to the details of construction, arrangement, and, composition of the corresponding device thereof, set in the description, drawings, or examples of the present invention.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described in conjunction with specific embodiments and examples thereof, it is to be understood that they have been presented by way of example, and not limitation. Moreover, it is evident that many alternatives, modifications and variations will be apparent to those skilled in the art. Accordingly, it is intended to embrace all such alternatives, modifications and variations that fall within the spirit and broad scope of the appended claims and their equivalents.

What is claimed is:

1. A device for adjacent channels operation comprising:
an array antenna comprising at least one antenna element,
at least one signal downconverter coupled to each said at least one antenna element,
at least one filter coupled to said at least one signal downconverter, and
at least one signal upconverter coupled to said at least one filter,
wherein said array antenna is a circular polarized anay antenna comprising a feeding patch having cross recessed corners, and a radiating patch having cross recessed corners complementary with the cross recessed corners of the feeding patch, and
each element of said circular polarized array antenna comprises at least two radiating elements fed from the same input.

2. The device of claim 1, wherein said signal upconverter is upconverting the signal to approximately the original frequency of said signal.

3. The device of claim 2, wherein said at least one signal downconverter is downconverting the signal to a predefined intermediate frequency having available standard filters.

4. The device of claim 2, wherein said downconverter and said upconverter are using a same local oscillator.

5. The device of claim 2, further comprising at least one additional downconverter.

6. The device of claim 2, further comprising at least one standard transceiver coupled to said at least one signal upconverter.

7. The device of claim 1, wherein said signal upconverter is upconverting the signal to a predefined frequency in which off-the-shelf transceiver exists.

8. The circular polarized array antenna of claim 1, wherein the characteristics of said circular polarized away antenna are controlled by setting different values and combinations to parameters comprising: (a) size of said cross-recessed corners, (b) distance between the two radiating elements fed from the same input, (c) distance between said radiating patch and said feeding patch, (d) thickness and type of a sandwiched dielectric material located between said feeding patch and said radiating patch.

9. A device for adjacent channels operation comprising:
an array antenna comprising at least one antenna element,
at least one signal downconverter coupled to each said at least one antenna element,
at least one filter coupled to said at least one signal downconverter, and
at least one signal upconverter coupled to said at least one filter,
wherein said array antenna is a circular polarized stacked array antenna comprising: (a) feeding patches having cross recessed corners, (b) radiating patches having cross recessed corners, (c) at least one sandwiched cross-recessed corner patch, wherein the patches are arranged in such a way that every two following stacked patches are cut in the complementary corners.

* * * * *